United States Patent [19]

Nadeau

[11] 4,147,190
[45] Apr. 3, 1979

[54] DELIMBING APPARATUS

[76] Inventor: Georges E. Nadeau, 167 Golden Ave., Apt. 10, Timmins, Ontario, Canada

[21] Appl. No.: 808,630

[22] Filed: Jun. 21, 1977

[30] Foreign Application Priority Data

Jun. 22, 1976 [CA] Canada .................................. 255463

[51] Int. Cl.² .......................... A01G 23/08; B27L 1/00
[52] U.S. Cl. ...................................... 144/2 Z; 83/159; 144/309 AC
[58] Field of Search ............... 144/2 Z, 2 AA, 208 R, 144/3 D, 311, 309 AC, 109; 83/119, 157, 158, 159

[56] References Cited

U.S. PATENT DOCUMENTS

| | | |
|---|---|---|
| 3,572,410 | 3/1971 | McElderry .......................... 144/2 Z |
| 3,624,756 | 11/1971 | Mellgren ........................... 83/109 X |
| 3,809,134 | 5/1974 | McCabe .............................. 144/2 Z |
| 3,868,981 | 4/1975 | Nadeau ............................... 144/2 Z |

FOREIGN PATENT DOCUMENTS

475269  6/1975  U.S.S.R. ................................ 144/2 Z

Primary Examiner—Othell M. Simpson
Assistant Examiner—W. D. Bray
Attorney, Agent, or Firm—Cushman, Darby & Cushman

[57] ABSTRACT

Apparatus as described which includes first and second groups of cutter blades arranged to engage and sever limbs from one or more moving tree trunks as they are being drawn through the apparatus. The apparatus incorporates means for ejecting the accumulated severed limbs from the apparatus. Also included are improved means for holding the cutter blades in limb severing engagement with the tree trunks.

8 Claims, 11 Drawing Figures

DELIMBING APPARATUS

This invention relates to improvements in apparatus for delimbing felled trees.

BACKGROUND OF THE INVENTION

Many highly sophisticated machines have been devised in recent years for delimbing trees and many of these have been very successful. However, most of these machines are quite expensive and thus beyond the reach of very small operators, e.g. very small logging companies, and individuals who may only have use for a delimbing device for a short period of time each year.

My U.S. Pat. No. 3,868,981 issued Mar. 4, 1975, the disclosure of which is incorporated herein by reference, and my corresponding Canadian Pat. No. 945,875 issued Apr. 23, 1974 disclose an effective, yet relatively simple form of delimbing apparatus particularly suitable for small to medium size operations. The delimbing apparatus described in the above patents includes a base adapted to be secured in a fixed position and means attached to the base and supporting first and second groups of cutter blades. The cutter blades are arranged to engage and sever limbs from one or more moving tree trunks in engagement therewith. The means supporting the first and second groups of cutter blades are arranged to hold said first and second groups of blades in limb severing engagement with first and second opposing sides, respectively, of tree trunks which, in operation, are moved longitudinally through the delimbing apparatus whereby to sever limbs from said tree trunks.

In the operation of the above device, the limbs which were severed from the tree trunks were allowed to collect below the cutter blades and were periodically removed either by hand or by the use of the front end blade of a log skidder or tractor. However, this operation has proven to be somewhat time consuming and involves the use of extra labour.

BRIEF SUMMARY AND OBJECTS OF THE INVENTION

One object of the present invention to provide apparatus of the character described above which incorporates means for ejecting the accumulated severed branches from the apparatus.

Thus, the present invention provides, in one aspect, apparatus for delimbing felled trees comprising, a base adapted to be secured in a fixed position, first and second groups of cutter blades, support means attached to said base for supporting said first and second groups of cutter blades therealong, said supporting means for said blades being arranged such that the blades are capable of simultaneously engaging a plurality of generally parallel tree trunks in such manner as to sever limbs from said trunks when the latter move longitudinally through said apparatus, and means associated with said means for supporting said first and second groups of cutter blades adapted to hold said first and second groups of blades in limb severing engagement with first and second opposing sides, respectively, of said tree trunks as they are moved longitudinally through the delimbing apparatus, whereby to sever limbs from said tree trunks, and means for removing accumulated severed limbs from the delimbing apparatus.

In a further aspect said means for removing severed limbs includes a movably mounted ejector means arranged to receive and support thereon limbs severed from the tree trunks by said blades, and means associated with said ejector means to effect movement of the same in a direction such as to cause the limbs accumulated thereon to be moved away from the cutter blades.

In a still further aspect said ejector means is mounted for pivotal movement relative to said frame from a generally horizontal position for the accumulation of severed limbs thereon to a second position wherein the limbs are caused to be moved away from the cutter blades.

In a still further aspect the means to effect pivotal movement of the ejector means includes a linkage mechanism including a portion extending outwardly from a portion of said base and adapted to be depressed or changed in position by the passage thereover of a wheel of a tractor or the like whereby to effect said movement of the ejector means to said second position.

A further object of the invention is to provide improvements in the actuator means for holding the cutter blades in limb severing engagement with the tree trunks as they are moving through the delimbing apparatus.

Accordingly a further aspect of the invention provides apparatus for delimbing felled trees comprising, a base adapted to be secured in a fixed position, first and second groups of cutter blades, first and second support means attached to said base for supporting said first and second groups of cutter blades respectively, said first and second support means for said blades being arranged such that the blades are capable of simultaneously engaging a plurality of generally parallel tree trunks in such manner as to sever limbs from said trunks when the latter move longitudinally through said apparatus, one of said first and second support means including a swing arm which supports one of said groups of cutter blades and being movable from a first position to a second position wherein the group of cutter blades supported thereon comes into limb severing engagement with the tree trunks, and actuator means associated with said swing arm for moving same between the first position and the second position including rotatable roller means having teeth thereon for engaging the moving tree trunks, clutch means operatively connecting said rotatable roller means to said swing arm, rotation of the rotatable roller means in one direction in response to said movement of the tree trunks serving to move said swing arm to the second position, means for biasing the swing arm to the first position after passage of the tree trunks through the apparatus, and means for disengaging the clutch means after the tree trunks have passed through said apparatus whereby movement of the swing arm to the first position under the influence of the biasing means does not effect rotation of the rotatable roller means in the opposite direction thus reducing the possibility of severed limbs becoming wrapped on the toothed roller means.

BRIEF DESCRIPTION OF THE DRAWINGS

In drawings which illustrate an embodiment of the invention.

Figure 1:
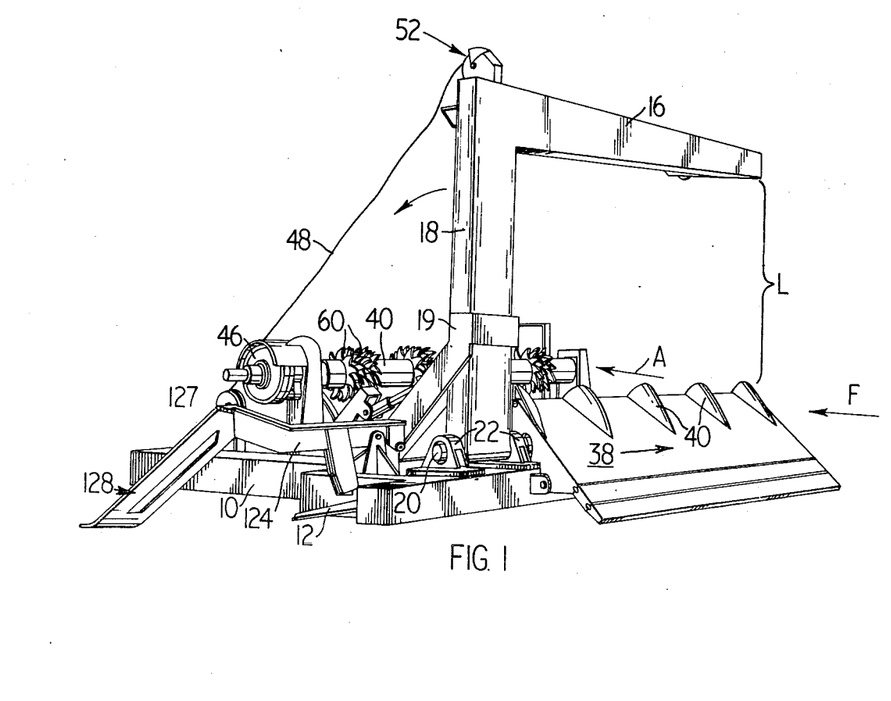
FIG. 1 is a perspective view of a delimber incorporating the invention as seen generally from one side thereof.
Figure 2:
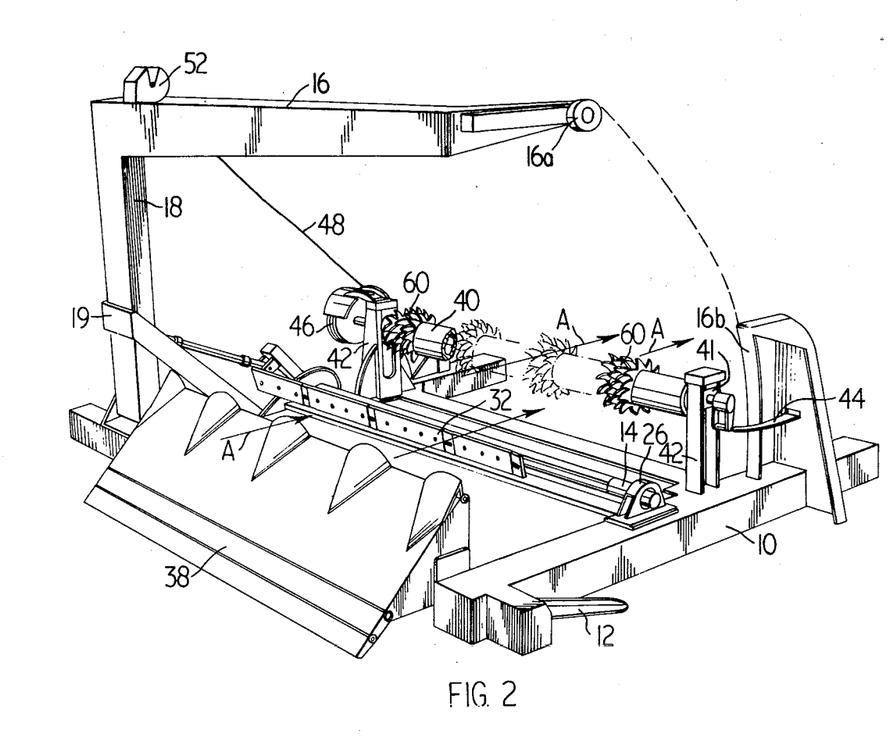
FIGS. 2, 2A are perspective views of the delimber as seen generally from the other side thereof.
Figure 2A:
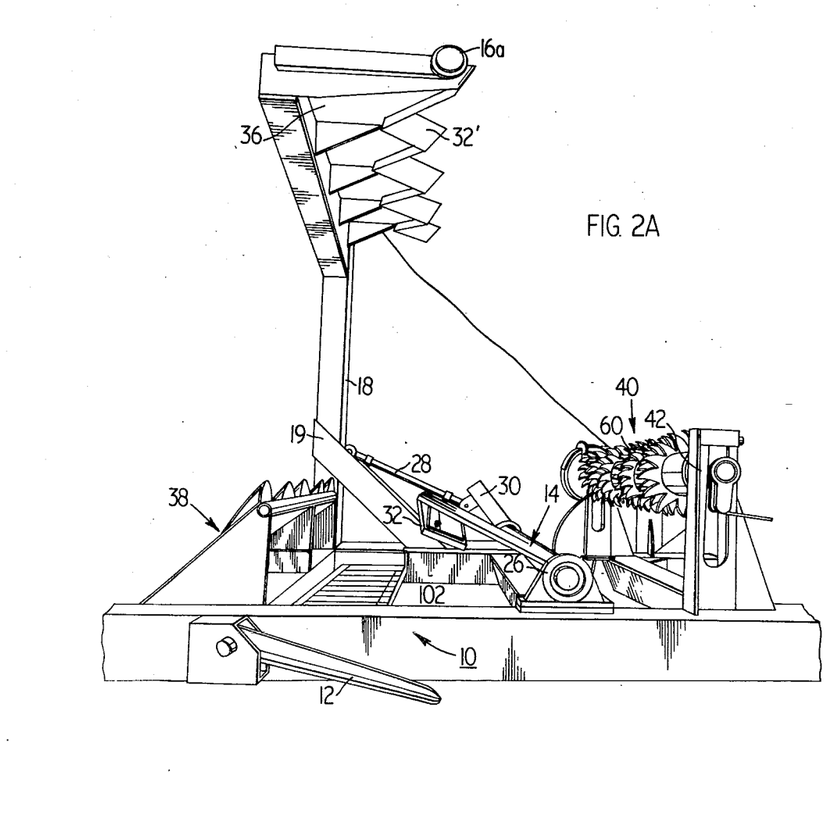

As best seen in FIGS. 1-2A the delimber includes a generally flat base 10 of rigid structural steel materials and adapted to lie flat on the ground. Base 10 is adapted to be anchored to the ground via suitable anchorages 12 in the form of pointed bars pivoted to the frame 10 and arranged to dig into the ground to prevent movement of the delimber along the ground as trees are pulled through the device in the direction of arrows A in FIGS. 1 and 2 during use.

DETAILED DESCRIPTION OF THE INVENTION

The delimber includes a spaced apart generally parallel horizontally extending pair of cutter blade supports or "bars" identified as 14 and 16. The upper blade support bar 16 is pivotally attached to base 10 via an elongated swing arm 18 the upper end of which is rigidly connected to one end of blade support bar 16 and the lower end of which is rigidly connected to pivot rod 20. Pivot rod 20 is rotatably mounted in spaced apart bearings 22 secured to the base 10. A coil torsion spring 24 (FIG. 5) disposed about pivot rod 20 and coacting between swing arm 18 and base 10 serves to resiliently bias the swing arm 18 towards an upright position such upright position being defined by a stop bracket 19 attached to frame 10.

The lower blade support bar 14 is also pivotally attached to base 10, and as shown in the drawings, this blade support bar 14 is rotatably mounted in spaced parallel relation to the aforementioned pivot rod 20 in spaced bushings 26 which are rigidly secured to base 10.

The two blade support bars 14 and 16 are operatively connected for pivotal movement together about their respective rotation axes by means of (with particular reference to FIG. 3) 28 which is pivotally connected at one end to swing arm 18 via pivot hinge 29 and at its other end via a suitable pivot hinge to a relatively short pull arm 30, the latter being rigidly secured to the lower blade support bar 14 for pivotal movement therewith. Thus, rotational movement of blade support bar 14 as is caused in a manner to be described in more detail hereinafter causes rotational movement of upper blade support bar 16 in the same direction by virtue of the operative connection therebetween as described above in essentially the same fashion as described in my prior U.S. Pat. No. 3,868,981.

It will be noted here that since one end only of blade support bar 16 is connected to the base, via swing arm 18, that the other side of the delimber is open; that is, an open loading region L, as seen in FIG. 1, is provided whereby to allow for ease of loading of trees into the apparatus, as described hereinafter. In order to prevent undue stressing and deflection of the upper blade support bar 16, the free end of same carries a roller 16a which cooperates with a guide 16b rigidly secured to the base 10 as seen in FIG. 2. During operation, roller 16a bears against guide 16b to absorb some of the load applied to support bar 16 as a result of the delimbing operation.

The blade support bars 14 and 16 are provided with a plurality of lower and upper cutter blades 32 and 32', respectively, arranged to engage and sever limbs on tree trunks passing through said delimber. Each blade support bar 14, 16 has rigidly welded thereto a heavy elongated support plate 34, 36 respectively, each of the latter having that marginal edge remote from the support bar provided with a series of V-shaped notches. The marginal edges defining the notched portions each have a sharp cutter blade 32, 32' extending therealong and rigidly secured thereto by any suitable means whereby corresponding V-shaped notches are defined between said cutter blades 32, 32'. Suitable blade attaching means are described in more detail in my aforementioned patents. A skid plate 38 is attached to the frame 10 at the inlet end of the apparatus. This plate slopes at a suitable angle, say 45°, to the horizontal and helps to guide the ends of the tree trunks upwardly and into position between the blade support bars 14 and 16. Suitable spaced tapered lobes 40 on the surface of the skid plate help to position the tree trunks correctly relative to the V-shaped notches defined between the sets of cutter blades 32, 32'. Each cutting blade 32, 32' is bevelled along its leading edge to provide a sharp cutting edge whereby to engage and sever limbs from trees which are partially disposed in the V-notches between the blades 32, 32' and moving in the general direction of arrow A relative to the blades.

Figure 9:
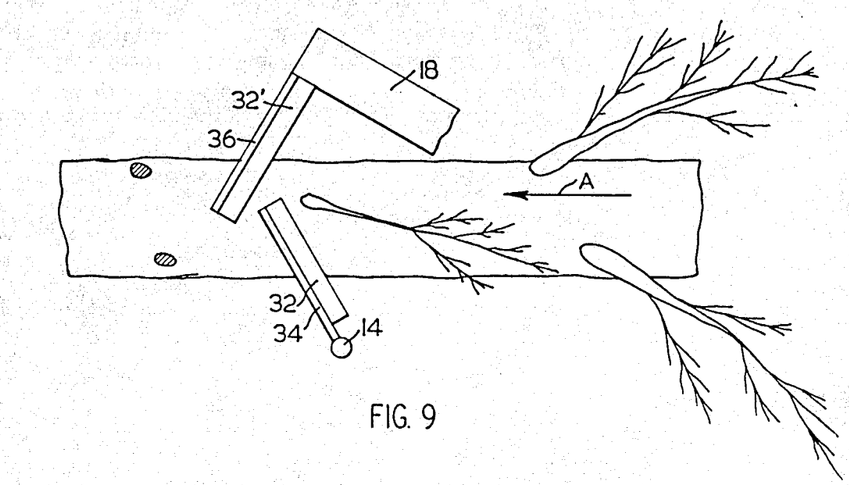
FIG. 9 is a diagrammatic view showing the blades in engagement with a tree trunk during operation of the device.

As described in my aforementioned patents, and with reference to FIG. 9, the cutter blades 32, 32' of the upper and lower blade support bars are angularly arranged such that when they are in contact with a tree trunk the cutting edges of the respective upper and lower sets of blades 32, 32' lie in planes which are oriented at acute angles to the longitudinal axis of the tree trunk. The reason for this is that it is desirable that the cutting edges of the cutter blades 32, 32' meet the limbs of the tree at an acute angle relative to the direction of movement of the tree through the device. This angled relationship promotes a smooth slicing action when the blades encounter the tree limbs and reduces the pulling forces which must be applied to the trees to promote severing.

The V-shaped notches defined between the cutter blades 32 supported on blade support bar 14 are vertically aligned with those defined by the blades 32' so that trees travelling through the machine in the direction of arrows A in FIG. 1 (which direction is generally at right angles to the elongated blade support bars) will first pass between the blades 32 of the lower leading blade support bar 14 whereby the limbs on the lower portion of the tree trunks are severed, with the tree then passing beneath the upper trailing blade support bar 16 whereby its blades 32' complete the operation by severing the limbs from the upper portions of the tree trunks.

The movement of the tree trunks in the direction of arrow A causes a torque to be applied to the cutter blades 32 of the lower leading blade support bar 14 which torque is transmitted via pull arm 30 and pull rod 28 to swing arm 18 which, in turn, applies forces to the upper trailing blade support bar 16 which tend to bring and hold its cutter blades 32' in contact with the upper surfaces of the tree trunks thus effecting delimbing of the upper as well as the lower portions of the moving tree trunks. Means for supplementing this action are described hereinafter. When the delimber is not in use, the coil torsion spring 24 connected between the swing arm 18 and base 10 brings the swing arm 18 to the upright position such that the various components occupy the relative positions shown in FIG. 2; however, this spring force is immediately overcome by the torsional forces applied by the moving tree trunk when the device is in operation as described above.

The additional means provided to hold the blades 32' of the upper blade support bar 16 in contact with the moving tree trunk during operation include an elongated roller 40 extending transversely of the delimbing apparatus, parallel to, slightly above and rearwardly, relative to a moving tree, of the lower blade support bar 14. Roller 40 is supported at its opposing ends in suitable bearings 41 which are slidably mounted in upright support posts 42, the latter being rigidly secured to base 10. Roller 40 is resiliently supported on leaf springs 44 mounted to the frame 10 and which bias roller 40 upwardly at all times. One end of roller 40 is provided with a flanged reel 46 to which one end of a flexible steel cable 48 is attached. The other end of this cable 48 is connected to the upper end of swing arm 18 in such a way that tension on cable 48 is maintained at all times so as to prevent it from jumping off reel 46. This connection includes a weight (not shown) anchored to the end of the cable 48 and free to move lengthwise within the tubular swing arm 18. The cable passes around a pulley 52 on the upper end of swing arm 18 for connection to the weight. When cable 48 is shortened and lengthened, swing arm 18 tends to swing counterclockwise and clockwise as seen in FIG. 1. If a situation occurs which would result in undue slack in cable 48, the weight simply moves along arm 18 under the influence of gravity to maintain at least some tension in the cable.

In order to cause roller 40 to grip and be rotated by the trunk of a tree moving while in contact with the roller, the latter is provided with a plurality of sharp hook-shaped teeth 60. The teeth are formed in metal plates which are secured in longitudinally spaced relation along roller 40 by welding with the tips of the teeth projecting tangentially outwardly from the roll circumference whereby to provide good engagement of the teeth with a tree trunk. Thus, as trees are pulled through the delimber, the resulting rotation of roller 40 and reel 46 will tension cable 48 and assist in rotating the swing arm 18 around sufficiently as to bring the blades 32' of the upper blade support bar 16 into contact with the upper surface of the tree. The above described action supplements the forces applied to swing arm 18 by pull arm 30 and pull rod 28 as described above and ensures effective delimbing under all conditions. Since roller 40 is spring mounted, the roller is pushed downwardly sufficiently by the weight of the tree trunks during operation so as to permit good engagement between the blades 32 of the lower support bar 14 and the individual trees.

Figure 10:
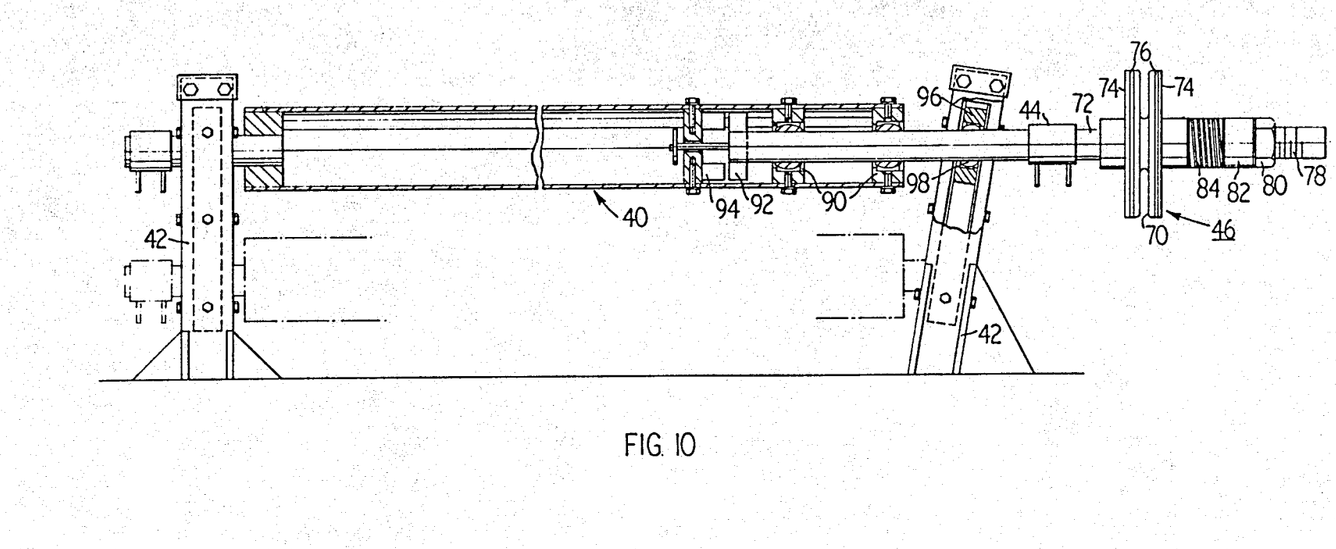
FIG. 10 is an elevation view partly in section of a tree engaging roller means and its internal clutch arrangement.

In order to limit the degree of tension on cable 48 during operation, reel 46 is provided with a slip clutch arrangement (FIG. 10). Reel 46 includes an intermediate grooved portion 70 which is rotatably mounted on drive shaft 72 of roll 40 (for purposes of convenience teeth 60 are not shown on roll 40). A pair of opposed clutch elements 74 are disposed in flanking relation to intermediate portion 70 each of which is keyed to shaft 72 for rotation. Discs 76 of suitable friction material are interposed between the opposing faces of intermediate grooved portion 70 and clutch elements 74. The end of shaft 72 is threaded at 78 and has an adjustment nut 80 thereon bearing against collar 82. When nut 80 is rotated the biasing force exerted by a coil compression spring 84 is varied, thus varying the amount of pressure exerted on the friction discs 76, and consequently varying the maximum tension that can be applied to cable 48 during operation.

With further reference to FIG. 10 there is shown a clutch arrangement which eliminates rotation of roller 40 in the reverse direction after delimbing has been completed and the arm 18 is swinging to its upright position. It is desirable to prevent this reverse rotation since the hook-shaped teeth 60 on the roller have a tendency to engage accumulated severed branches with such branches wrapping around roller 40 if such reverse rotation is permitted. Accordingly, roll drive shaft 72 is arranged such that it can move both axially and rotationally relative to roll 40 under certain conditions. To accomplish this, roll 40 is provided with spaced apart bearings 90 adjacent one end thereof through which bearings shaft 72 passes in axially slidable relation thereto. The innermost end of shaft 72 is provided with radially extending lugs 92 which are adapted to engage with mating lugs 94 affixed to the inside of roller 40 when shaft 72 is shifted axially to the left relative to roll 40 as seen in FIG. 10. In order to effect this axial motion of shaft 72, support post 42' is inclined downwardly and inwardly. Shaft 72 is mounted in a slide block 96 within post 42 in a spherical bearing arrangement 98 which permits rotation of shaft 72 therein but no axial motion thereof relative to slide block 76. The other end of roll 40 is rotatably mounted in a slide block arrangement in post 42 which permits vertical motion but no motion of roll 40 in the axial direction. Hence, when roller 40 is pushed downwardly by the tree trunks against the force of the leaf springs 44 during operation, the downward and inward movement of slide block 96 along inclined post 42' causes shaft 72 to move axially inwardly to bring lugs 92 thereon into engagement with lugs 94 on roller 40 thus effecting rotation of flanged reel 46 along with roller 40 and hence tensioning cable 48 and causing angular motion of swing arm 18. After the delimbing has been completed and the tree trunks are clear of the roller 40, the leaf springs lift the roller upwardly with shaft 72 moving axially outwardly relative to roll 40 to disengage lugs 92 from lugs 94. As arm 18 swings upwardly under the influence of spring 24, cable 48 unwinds from reel 46 thus rotating same; however roll 48 is not compelled to rotate therewith and thus it does not tend to pick up branches and other debris thereon and to wind same on the roller.

Figure 4:
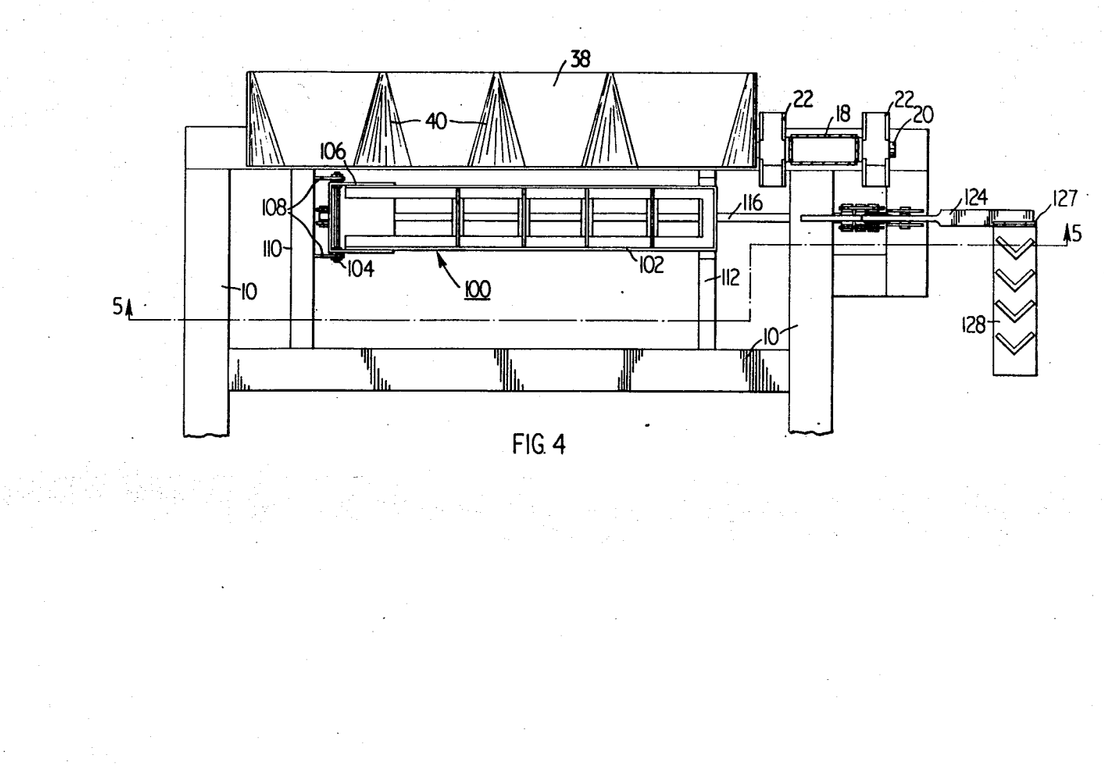
FIG. 4 is a plan view of one form of branch removal means according to the invention.
Figure 5:
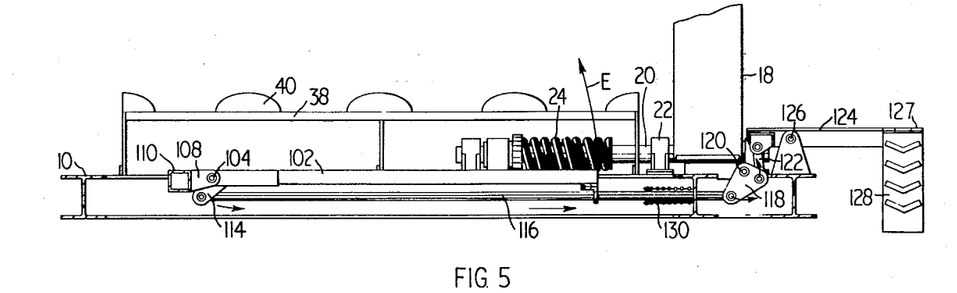
FIG. 5 is a section view taken along line 5—5 of FIG. 4.

The branch removal mechanism will now be described with particular reference to FIGS. 4 through 7. The first embodiment is shown in FIGS. 4 and 5. The branch removal mechanism is designated generally by the reference numeral 100 and it will be seen from FIGS. 4 and 5 that it includes a generally elongated, planar, grid-like ejector for severed branches, such ejector being designated 102. The branch ejector extends transversely of the delimbing apparatus between the skid plate 38 and the lower blade support bar 14 at a level slightly below the level of bar 14 and parallel thereto. The branch ejector 102 is pivotally mounted for movement in a vertical plane at that end thereof which is remote from the swing arm 18. The pivot means includes a horizontally disposed pivot shaft 104 extending through apertures provided in a bracket 106 welded to one end of branch ejector 102. The pivot shaft 104 also extends through spaced apart lugs 108 which are welded to a tubular frame member 110 which, in turn, is firmly welded to the support frame 10. The opposing end of branch ejector 102 is supported on a further frame member 112 which is parallel to member 110 and which is firmly welded to base frame 10.

A relatively short arm 114 is welded to bracket 106 such arm 114 being pivotally connected to an elongated rod 116 which, in turn, is connected to a toggle plate 118. Toggle plate 118 is pivotally connected to frame 10 via pivot shaft 120. Toggle plate 118 is also pivotally connected to a short rod 122 which, in turn, is connected pivotally to the inner end of lever arm 124 the latter having a fulcrum at pivot point 126 such pivot point 126 being defined by a transversely extending shaft and suitable lugs firmly welded to frame 10.

Figure 3:
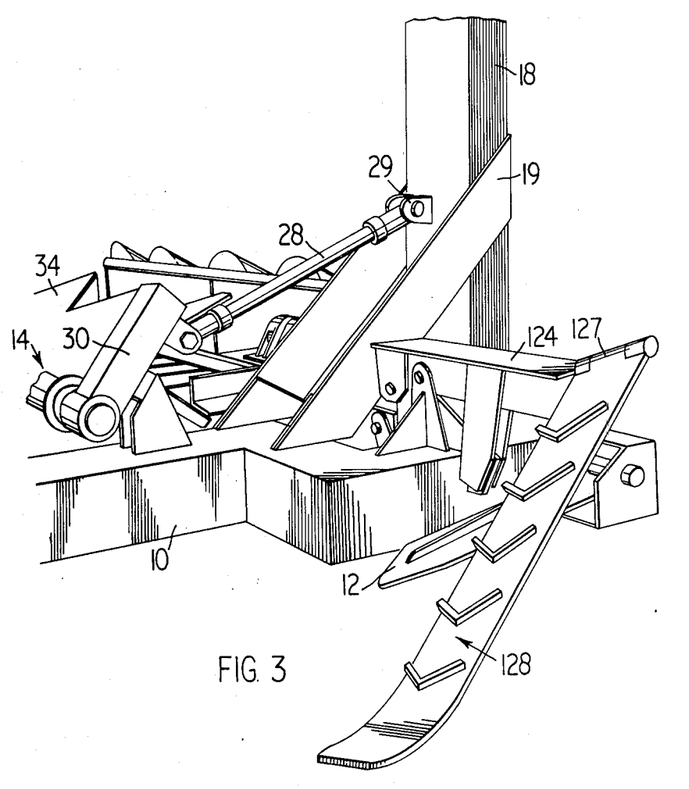
FIG. 3 is a further perspective view of the delimber showing actuator means for the branch removal means of the invention.

The outer end of lever 124 is connected by a hinge 127 to a ramp 128 having cleats thereon (see also FIG. 3). This ramp is designed so as to permit a log skidding tractor to be driven thereon thereby to force the outer end of lever 124 downwardly thus effecting rotation of toggle member 118 and movement of rod 116 in the axial direction as shown by the arrows in FIG. 5. This causes the branch ejector to pivot rapidly upwardly in the direction shown by arrow E thus throwing branches accumulated thereon outwardly and away from the "open" side of the delimbing apparatus. A suitable spring arrangement, such as a coil compression spring 130 disposed on axially movable rod 116 acts to return the branch ejector 102 to the horizontal or "home" position whereby it is capable of accumulating further severed branches thereon.

Figure 6:
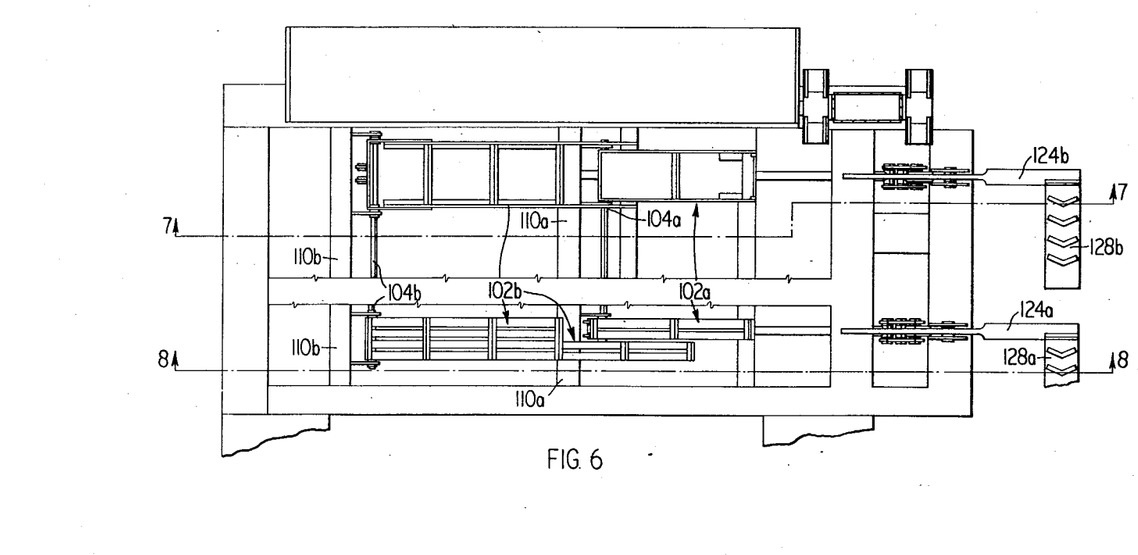
FIG. 6 is a plan view of a modified form of branch removal means according to the invention.
Figure 7:
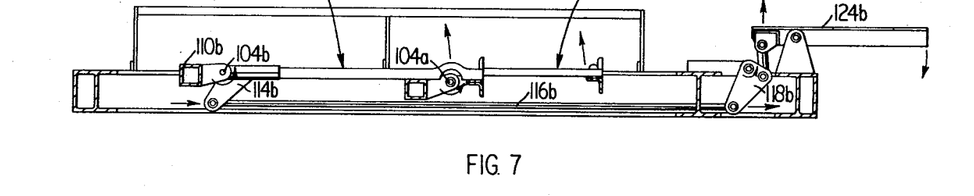
FIG. 7 is a cross-section view taken along line 7—7 of FIG. 6.
Figure 8:
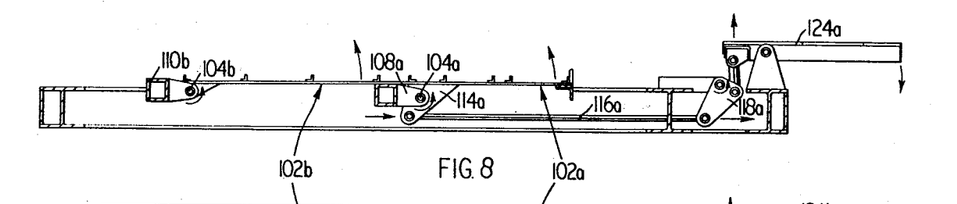
FIG. 8 is a section view taken along line 8—8 of FIG. 6.

The modification shown in FIGS. 6-8 is very similar in principle to that described above except that it acts to eject branches in two phases. The apparatus shown employs first and second sets of pivotally mounted branch ejector sets 102a and 102b which are positioned in parallel relationship to one another intermediate the skid plate 38 and the lower blade support bar 14 in essentially the same manner as described above. In order to avoid repetition of the description, reference numerals identical to those used in connection with FIGS. 4 and 5 have been used to designate parts having a function similar to those described above with the exception that the additional designation "a" has been added to each reference numeral associated with the "first ejector set" while the designation "b" has been added to the various reference numerals associated with the "second ejector set". The first ejector set includes ejectors 102a which are attached to pivot shaft 104a while the second ejector set includes ejectors 102b which are attached to pivot shaft 104b. Linkage mechanisms essentially the same as that described above interconnect ejectors 102a and 102b to lever arms 124a, 124b respectively. The lever arms 124a and 124b are positioned one after the other so that lever arm 124a is actuated prior to lever arm 124b. Each lever arm 124a and 124b is provided with a respective tread plate 128a and 128b respectively. In operation, the log skidding tractor is driven along side the delimbing device such that a wheel of same first passes along tread plate 128a thus pivoting lever 124a downwardly causing the first set of branch ejectors 102a to pivot rapidly upwardly thus throwing all the branches which have accumulated thereon onto the second set of branch ejectors 102b. After the wheel of the tractor has passed over the first tread plate 128a, the first set of ejectors 102a return to the "home" position and the tractor wheel thereafter passes over the second tread plate 128b thus actuating the second set of ejectors 102b and causing the branches thereon to be tossed outwardly to the side of the delimbing apparatus. It will be noted here that one of the second sets of ejectors 102b has an elongated portion which extends part way along side the first ejector 102a. This serves to clear any branches which might, by chance, have fallen back onto the first ejector 102a after the same has been actuated.

The above "two-phase" branch ejector is particularly useful when handling heavier than normal loads of branches.

In operation, the delimber is positioned a suitable distance, for example 100 feet, ahead of a pile of felled trees. A conventional log skidder is used to tow a small group of these trees forwardly toward the delimber. The skidder approaches the inlet end of the delimber and passes it on that side of the delimber which is "open" as illustrated by arrow F in FIG. 1. After the skidder has gone beyond the delimber a short distance, the operator changes direction again so as to pull the trees into alignment with the skidder so that the butt ends of the trees ride up on the skid plate 38. This serves to bring the trees in between the upper and lower blade support bars 14 and 16 and the cutter blades 32, 32' carried thereby. The trees then pass over the roller 40 thus pushing the same downwardly. The skidder then moves forwardly about 30 feet or so depending upon the overall length of the trees, at the same time paying out cable from its winch drum. With the skidder properly aligned with the delimber, the winch drum is put into operation whereby to pull the trees through the delimber. As soon as the trees begin to move through the delimber, the various forces described above come into play thereby to cause the swing arm 18 to pivot around so that the cutter blades 32' of the upper blade support bar engage the trees. The trees are then drawn through the delimber whereby the cooperating cutter blades 32, 32' of the lower and upper blade support bars 14 and 16 sever the limbs L from the trees. Once the trees have been drawn fully through the delimber the skidder itself moves forwardly and pulls the delimbed trees to a suitable location.

During the delimbing operation, the severed branches accumulate on the branch ejector described above. The operator of the log skidder, having removed the cable from the previously delimbed trees, then returns toward the delimber apparatus, this time passing by it in the opposite direction on that side where the above described tread plate 128 is located. He manoeuvres the vehicle such that a wheel of same passes over the tread plate 128 thereby actuating the branch ejector so as to clear the accumulated branches from the apparatus.

The delimber can handle several trees at a time. The operator will, of course, quickly learn from experience the optimum number of trees to be handled each time. This number will depend somewhat on the condition of the trees i.e. the number and size of branches, average trunk diameter etc. The delimber itself can be made in different sizes depending on the ranges of tree sizes to be handled.

I claim:

1. Apparatus for delimbing felled trees comprising, a base adapted to be secured in a fixed position, first and second groups of cutter blades, elongated support means attached to said base for supporting said first and second groups of cutter blades therealong generally transversely relative to said base, said supporting means for said blades being arranged such that the blades are capable of simultaneously engaging a plurality of generally parallel tree trunks in such manner as to sever limbs from said trunks when the latter are moved longitudinally relative to the base through said apparatus, and force transmitting means connected to said means for supporting said first and second groups of cutter blades, said force transmitting means being adapted to hold said first and second groups of blades in limb severing engagement with first and second opposing sides, respectively, of said tree trunks as they are moved longitudinally through the delimbing apparatus, whereby the sever limbs from said tree trunks, and means for removing accumulated severed limbs from the delimbing apparatus including a movably mounted ejector means movable between (a) a first position so related to said groups of blades as to enable the ejector means to receive and support thereon limbs which have been severed from the tree trunks by said blades to (b) a second position displaced from the groups of blades wherein the limbs accumulated thereon escape from the ejector means, and a motion transmitting linkage connected to said ejector means for moving the latter from the first position to the second position.

2. Apparatus according to claim 1 wherein said ejector means is mounted for pivotal movement relative to said base between said first position and said second position, said first position being a generally horizontal position for the accumulation of severed limbs thereon and said second position being a non-horizontal position such that the limbs are caused to escape from the ejector means.

3. Apparatus according to claim 2 wherein said motion transmitting linkage to effect said pivotal movement of the ejector means includes a portion extending outwardly from said base at a location such that said portion can be depressed or changed in position by the passage thereover of a wheel of a tractor or the like, said linkage portion being adapted to move another portion of the motion transmitting linkage in such a way as to effect said movement of the ejector means to said second position.

4. Apparatus according to claim 3 wherein said ejector means comprises an elongated grid-like structure which extends, in the horizontal first position, generally parallel to said groups of cutter blades, said pivotal mounting defining a pivot axis which extends longitudinally relative to the base to provide for the pivotal movement of said elongated structure in a generally vertical plane which is parallel to said groups of cutter blades.

5. Apparatus according to claim 3 wherein the ejector means comprises a pair of said elongated ejector structures and a pair of said motion transmitting linkages, each of the latter being connected to a respective one of said elongated ejector structures to permit said respective ejector structures to be moved in sequence to effect the removal of the severed limbs from the apparatus, said pair of ejector structures being located in aligned relation to one another so that upon actuation of a first one of same the limbs thereon are transferred to the second ejector structure with the second ejector structure, upon actuation, serving to remove the limbs from the apparatus.

6. Apparatus for delimbing felled trees comprising, a base adapted to be secured in a fixed position, first and second groups of cutter blades, first and second elongated support means attached to said base for supporting said first and second groups of cutter blades respectively, said first and second support means for said blades being disposed generally transversely relative to said base such that the blades are capable of simultaneously engaging a plurality of generally parallel tree trunks in such manner as to sever limbs from said trunks when the latter are moved longitudinally relative to the base through said apparatus, one of said first and second support means including a swing arm which supports one of said groups of cutter blades and being movable in an arcuate path from a first position to a second position wherein the group of cutter blades supported thereon comes into limb severing engagement with the tree trunks, and actuator means connected to said swing arm for moving same between the first position and the second position, said actuator means including rotatable roller means having teeth thereon for engaging the longitudinally moving tree trunks, clutch means engageable to operatively connect said rotatable roller means to said swing arm such that rotation of the rotatable roller means in one direction in response to said longitudinal movement of the tree trunks serving to move said swing arm to the second position to position said group of cutter blades supported thereon in limb severing engagement with the tree trunks, means for biasing the swing arm to the first position after passage of the tree trunks through the apparatus, and means for disengaging the clutch means after the tree trunks have passed through said apparatus whereby the movement of the swing arm to the first position under the influence of the biasing means does not effect rotation of the rotatable roller means in the opposite direction thus reducing the possibility of severed limbs becoming wrapped on the toothed roller means.

7. Apparatus according to claim 6 wherein said roller means is transversely disposed in relation to said base for the passage of said trees thereover, means resiliently supporting said toothed roller means so the latter is moved downwardly relative to said base in response to the weight of tree trunks moving thereover, said clutch means being associated with means which are actuated by the downward movement of the roller means to effect engagement of the clutch means in response to the weight of tree trunks thereon.

8. Apparatus according to claim 6 further including slip clutch means for limiting the degree of force applied to said swing arm by virtue of rotation of the roller means.

* * * * *